United States Patent [19]

Stahlecker

[11] Patent Number: 5,675,964
[45] Date of Patent: Oct. 14, 1997

[54] OPEN END SPINNING SUPPORTING DISK WITH ASYMMETRIC MAGNETIC ROTATIONAL SPEED INDICATOR

[75] Inventor: Fritz Stahlecker, Josef-Neidhart-Strasse 18, 73337 Ueberkingen, Germany

[73] Assignees: Fritz Stahlecker, Bad Ueberkingen; Hans Stahlecker, Suessen, both of Germany

[21] Appl. No.: 596,562

[22] Filed: Feb. 5, 1996

Related U.S. Application Data

[63] Continuation-in-part of Ser. No. 234,382, Apr. 28, 1994, Pat. No. 5,509,262.

[30] Foreign Application Priority Data

Apr. 27, 1993 [DE] Germany .......................... 43 13 753.9

[51] Int. Cl.$^6$ ...................................................... D01H 4/12
[52] U.S. Cl. ........................... 57/406; 57/264; 57/407; 384/549
[58] Field of Search ...................... 57/406, 264, 263, 57/265, 407; 384/549, 448

[56] References Cited

U.S. PATENT DOCUMENTS

| | | |
|---|---|---|
| 4,019,310 | 4/1977 | Seidl et al. ............................ 57/265 |
| 4,033,107 | 7/1977 | Sasayama et al. ..................... 57/264 X |
| 4,080,775 | 3/1978 | Stahlecker ............................. 57/263 |
| 4,150,530 | 4/1979 | Derichs ................................. 57/263 |
| 4,566,262 | 1/1986 | Schmucker ............................ 57/264 |
| 4,809,491 | 3/1989 | Heinen et al. ......................... 57/264 X |
| 4,890,942 | 1/1990 | Raasch .................................. 57/406 |
| 5,362,160 | 11/1994 | Braun et al. ........................... 57/406 |
| 5,509,262 | 4/1996 | Stahlecker ............................. 57/264 |
| 5,517,814 | 5/1996 | Stahlecker ............................. 57/406 |

FOREIGN PATENT DOCUMENTS

| | | |
|---|---|---|
| 2422943 | 11/1975 | Germany . |
| 2507199 | 9/1976 | Germany . |
| 2544209 | 3/1990 | Germany . |
| 3926664 | 3/1990 | Germany . |
| 4121387 | 1/1993 | Germany . |

*Primary Examiner*—William Stryjewski
*Attorney, Agent, or Firm*—Evenson McKeown Edwards & Lenahan PLLC

[57] ABSTRACT

In the case of a supporting disk for a supporting disk bearing for open-end spinning rotors, the front side is provided with signal generators for the purpose of non-contact revolution counting, which function by means of magnetic field lines. Preferred are permanent magnetic pins which fit into the supporting disk, and which create an induction current. Single magnet embodiments include removal of surrounding disk material to mechanically balance the disk.

26 Claims, 4 Drawing Sheets

OPEN END SPINNING SUPPORTING DISK WITH ASYMMETRIC MAGNETIC ROTATIONAL SPEED INDICATOR

This application is a continuation-in-part application of application Ser. No. 08/234,382, filed Apr. 28, 1994 now U.S. Pat. No. 5,509,262.

BACKGROUND AND SUMMARY OF THE INVENTION

The invention relates to a supporting disk for a supporting disk bearing for open-end spinning rotors, which supporting disk has a front side provided with at least one signal generator for non-contact revolution counting.

Supporting disks of this general type are described in German patent application 41 21 387. Two reflectors are embedded in suitable recesses in the surface of the front side, which are used for non-contact counting of revolutions of the open-end spinning rotors. In the case of heavy flue of the fiber material which is to be spun, a visual measurement, carried out with the aid of the reflectors, does not deliver a reliable signal.

In German patent application 25 07 199, corresponding to U.S. Pat. No. 4,150,530, the way the mentioned reflectors work is described. Accordingly, by means of non-contact counting of the revolutions of the spinning rotors, a piecing process is controlled by a travelling maintenance device. Here the reflectors are formed as colored markings, to which a photoelectrical impulse receiver is arranged at a short distance away from them, which receiver can be a component of a maintenance device, emitting a light beam which is variably reflected. The impulse receiver is connected to a plotting device. In the introductory part of the description, the fact that the triggering of the impulses can, when required, be activated by use of a capacitive or inductive proximity switch, is mentioned only briefly.

In German patent application 25 44 209, corresponding to U.S. Pat. No. 4,080,775, non-contact counting of the revolutions of spinning rotors is described with the aid of two equivalent ways, namely either by scanning the supporting disk or by scanning the shaft of the open-end spinning rotor. In the first case, the supporting disk has a marking which is scanned without contact by a measuring head during the run-up of the open-end spinning rotor. In two second case, the shaft of the open-end spinning rotor is provided with signal transmitting recesses around its circumference, which rotate past a measuring head.

in German patent application 24 22 943, a small metal false twist spindle arranged on supporting disks is described, which is provided with a cross hole and whose revolutions are scanned without contact by a sensor. The sensor comprises two coils whose magnetic fields are disturbed when the cross hole changes its position. This can be used to generate electrical signals in a plotting station.

In German patent application 39 26 664 it is disclosed that for the ascertainment of the current revolutions of an open-end spinning rotor, a sensor is advanced to the open-end spinning rotor. The open-end spinning rotor consists of ferromagnetic material and is magnetized at certain intervals. The magnetic field of the open-end spinning rotor changes with the revolutions of the open-end spinning rotor and generates various signals in this way.

In the case of practically constructed open-end spinning machines, supporting disks provided with reflectors have been used exclusively up to now for the purpose of non-contact revolution counting of open-end spinning rotors.

It is an object of the invention to carry out fail-safe revolution counting, even when the danger of flue on the supporting disks due to fiber material exists.

This and other objects are achieved according to the invention in that a signal generator is provided, which functions by means of magnetic field lines.

It is possible, while dispensing with an optical measurement, to receive reliable signals in relation to the current revolutions of the supporting disks and therefore indirectly those of the open-end spinning rotors, using the supporting disks according to the invention. This can take place in many ways.

In one version, a signal generator which generates magnetic field lines is provided, and which, for example generates an induction current in an impulse receiver; the said induction current is then evaluated at a plotting station.

In a second version a signal generator which alters magnetic field lines is provided, which for example alters the magnetic field of the coils of an impulse receiver and thereby generates plottable signals.

In the first version the signal generator is a permanent magnet, which can be fitted into a recess on the front side of the supporting disk.

In the second version, the signal generator can consist of a ferromagnetic material, for example in the form of a steel pin.

In both cases it is practical when the supporting disk consists of aluminum or synthetic material it should in any case be of a different material from that of the chosen material for the signal generator. It is advantageous when two signal generators are used which are disposed diametrically opposite to the axle of the supporting disk, so that problems of imbalance do not arise.

Embodiments are also contemplated where two bore holes in the front side of the supporting disk are used as signal generators, whereby the inevitably arising air blast is registered and read as a signal.

In other preferred embodiments, only a single magnet is mounted in the bearing disk at a spacing from the bearing disk rotational axis. The magnet material is different than the bearing disk material and exhibits a higher density or specific gravity. In order to mechanically balance the bearing disk, even with only a single magnet being required, the present invention contemplates various structures and methods of construction. The embodiments with only a single magnet are especially advantageous with respect to cost savings, since only a single magnet is required, rather than the two magnets of the other disclosed preferred embodiments utilizing magnets.

According to certain preferred embodiments utilizing only one magnet, the mechanical balancing can be achieved by providing a balancing weight attached to the diametrically opposite side of the disk where the magnet is mounted.

Other preferred embodiments having only a single magnet attain the mechanical balancing in a simple and economical manner by removing material from the basic disk in the immediate proximity of the magnet by such an amount that the weight of the removed material corresponds approximately equally to the weight of the magnet which is installed on the disk. Certain preferred embodiments implementing this approach include one or more bore holes in the disk in the immediate proximity to the magnet.

Other especially advantageous preferred embodiments provide that the magnet is axially thinner than the axial extent of the bearing disk at a bore hole in the bearing disk where the magnet is mounted. The bore hole where the magnet is mounted is larger than the magnet and is sized in such a manner that the weight of the material removed in forming the bore hole is substantially approximately equal to the weight of the magnet material of the installed magnet.

According to certain preferred embodiments, a relatively large bore hole for the magnet mounting is made and the edge of the bore hole is plastically deformed to form a catch or a mounting step for positioning and holding the magnet.

According to other preferred embodiments of the invention with a single magnet, a stepped bore hole is provided in the disk by means of a stepped drill, with a small diameter center area part of the bore hole serving to receive the magnet. Again, the dimensions of the stepped bore hole are such that the material removed from the disk has a weight substantially equal to the weight of the magnet held in the bore hole.

In preferred embodiments of the invention, the magnet is securely glued into the bearing disk. This arrangement is advantageous over arrangements with magnets pressed into the bearing disk bore. Because of the relative brittleness of magnets to be installed the gluing exerts less damaging stress on the magnet than would a press fit connection.

According to especially preferred embodiments, the magnet used is manufactured of rare earth metals, and a preferred example is NdFeB (Neodym-Iron-Boron. This material is advantageous since it satisfies practical requirements for the magnet in this particular field of application. First, the magnet from such material can be manufactured to be relatively small and still contain a relatively large magnetic field for a sensor spaced from the disk for receiving an impulse signal with sufficient certainty during rotation of the disk. Further, such materials for the magnet assure that the magnet retains its magnetic properties despite the expected in-use vibrations and shaking.

In a further version it is also contemplated for the signal generator to be a bore hole embedded in a base body of steel. At electrical signal can be alternatively received in this way.

It is advantageous according to preferred embodiments of the invention to provide the front side with a flat surface. This is particularly favorable with regard to the energy consumption. Fitted-in steel or magnetic pins should be flush with the surface. Existing bore holes can, as required, be covered over with foil. Unnecessary air turbulence should be avoided at all times according to especially preferred embodiments.

Other objects, advantages and novel features of the present invention will become apparent from the following detailed description of the invention when considered in conjunction with the accompanying drawings. dr

DETAILED DESCRIPTION OF THE PREFERRED EMBODIMENTS

Figure 1:
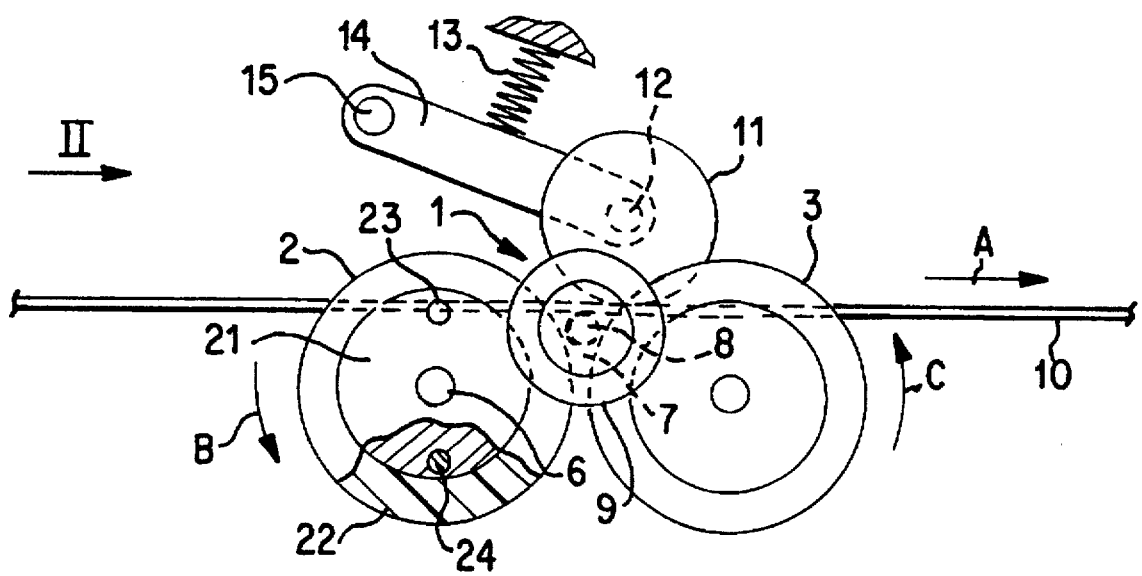
FIG. 1 is a partly sectional front view of a supporting disk bearing for an open-end spinning rotor, taken in the direction of arrow I of FIG. 2, with two signal generators which generate magnetic field lines, constructed according to a preferred embodiment of the invention.
Figure 2:
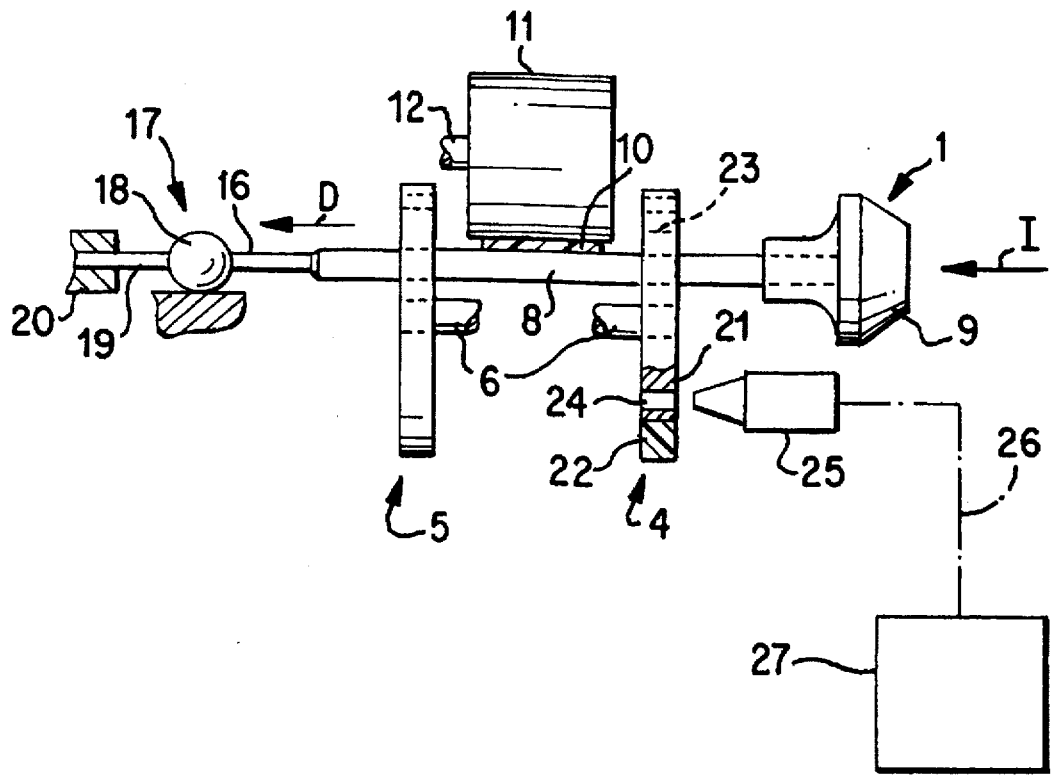
FIG. 2 is a partly sectional view in the direction of arrow II of FIG. 1, showing an impulse receiver connected to a plotting station.

The supporting disk bearing for an open-end spinning rotor 1 as shown in FIGS. 1 and 2 is a component of an open-end spinning unit. It comprises four supporting disks 2, 3, altogether, which are arranged as supporting disk pairs 4, 5, each on a common shaft 6. The shafts 6 run in anti-friction bearings arranged in bearing housings (not shown). The supporting disk pairs 4,5 are so arranged that they form two wedge-shaped gaps 7, in which the shaft 8 of the open-end spinning rotor 1 is supported in radial direction. The shaft 8 carries a rotor or rotor dish 9 at one end, in whose interior chamber the formation of yarn takes places in the known way.

The shaft 8 is driven by a tangential belt 10, which runs between the supporting disk pairs 4, 5 and which holds the shaft 8 in the wedge-shaped gap 7. The tangential belt 10 is tensed by a tension pulley 11 near the shaft 8. The tension pulley 11 is arranged in a swivel arm 14, which is pressed by a tension spring 13 and is pivotable around a swivel axis 15 extending transversely to the tangential belt 10, the tension pulley 11 being rotatable around an axle 12.

The shafts 6 of the supporting disk pairs 4, 5 are, in a known way, slightly inclined in opposite directions relative to each other so that, in connection with two sense of direction A of the tangential belt 10, due to two rolling of the shaft 8 on the rotating supporting disks 2, 3, according to arrow direction B and C, an axial thrust in the direction of arrow D is generated, which weights the shaft 8 with its free end 16 in the direction of a step bearing 17. The step bearing 17 contains a ball 18, which is continuously excited to vibrations due to the oscillations of the machine, the ball 18 being held by a thrust bearing 19 on the opposite side to the shaft 8, and being arranged adjustably in a part of a casing. Due to the machine oscillations, the ball 18 is excited to vibrations with low amplitude and high frequency, whereby due to the varying supporting points, a rotation of the ball 18 around several axes takes place.

The supporting disks 2, 3 each consist of a disk-like base body 21 as well as of a synthetic ring 22 connected to it, whose circumferential surface forms the bearing surface for the shaft 8 of the open-end spinning rotor 1. The base body 21, as seen in FIGS. 1 and 2, practically consists of aluminum or synthetic material.

It is known that during spinning, threads occasionally break, due to several causes. In such a case, a thread end which has already been spun must be joined again to fibers which have been fed into the inner chamber of the rotor dish 9. This happens often during the run-up of an open-end spinning rotor 1 which has previously been braked. It is thereby important to know at certain points during the run-up how many revolutions per minute the open-end spinning rotor 1 currently has. This is done in practice by non-contact counting of the current revolutions of a supporting disk 2, which gives indirect information about the current revolutions of the shaft 8 of the open-end spinning rotor 1 which is supported by the supporting disk pairs 4,5.

Because, as known already from practical operation, supporting disks optically scanned by reflectors sometimes deliver false signals, in particular when there is heavy flue due to fiber material flying around, it is intended according to the invention to use two signal generators 23 and 24 which function by means of magnetic field lines.

As shown in FIGS. 1 and 2, the signal generators 23 and 24 are transmitters which generate magnetic fields; they are formed as permanent magnetic pins which are flush on the front side and fitted securely into suitable bore holes. When the supporting disk 2 containing the signal generators 23 and 24 is rotated, a magnetic field is generated, which in turn is capable of generating an induction current in an impulse receiver 25. The impulse receiver 25 can be a component of a travelling piecing device, which moves lengthways along the open-end spinning machine (not shown), and advanced to a front side of the supporting disk 2 to be scanned in the area of its radius, on which the signal generators 23, 24, formed as magnetic pins, are attached. The distance between the impulse receiver 25 and the surface of the front side of the supporting disk 2 measures most advantageously between 3 and 6 mm. The induction current which has been generated is conducted over an electrical wire 26 to a plotting station 27, which is connected to various pilot motors of the piecing device (not shown).

This inductive method does not have the disadvantage that when the supporting disk pairs 4 and 5 are covered in flue, inaccurate signals are delivered.

Figure 3:
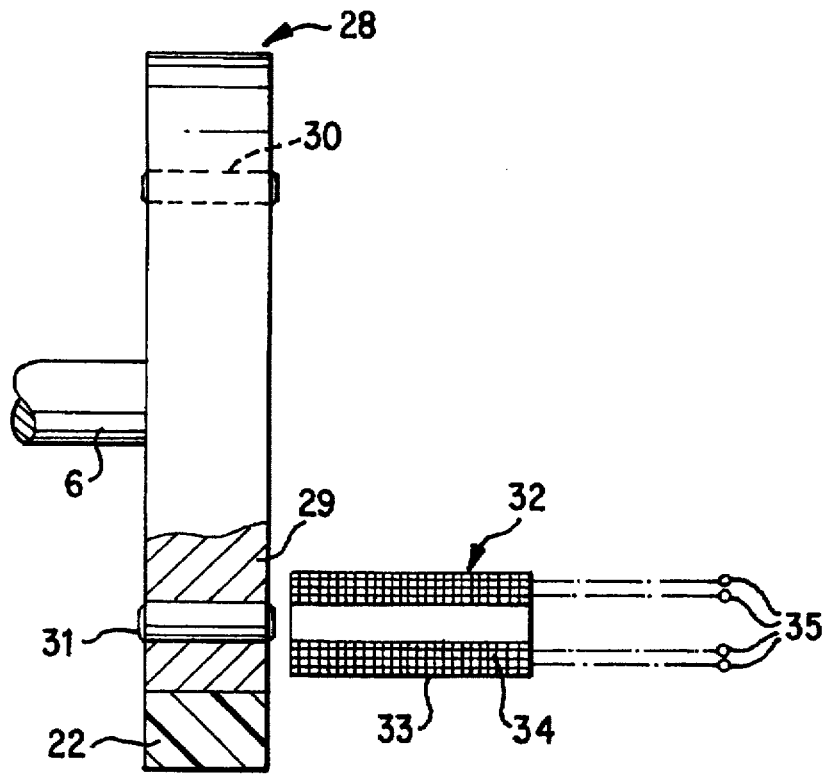
FIG. 3 is a somewhat enlarged supporting disk in a view similar to FIG. 2, with two signal generators which alter magnetic fields.

The supporting disk 28 as shown in FIG. 3 comprises two signal generators 30 and 31, which do not generate magnetic field lines, but rather alter magnetic fields. In the case of the supporting disk 28 as shown in FIG. 3, steel pins 30 and 31, in place of permanent magnet pins (as shown in FIGS. 1 and 2) are fitted into suitable bore holes of the base body 29 from the front side. When the supporting disk 28 is rotated, the steel pins 30 and 31 run past an impulse receiver 32, which then undergoes a change in magnetic field. The impulse receiver 32 can for example contain two coils 33 and 34, concentrically arranged to each other, which are connected to a plotting station by electrical terminals 35.

Figure 4:
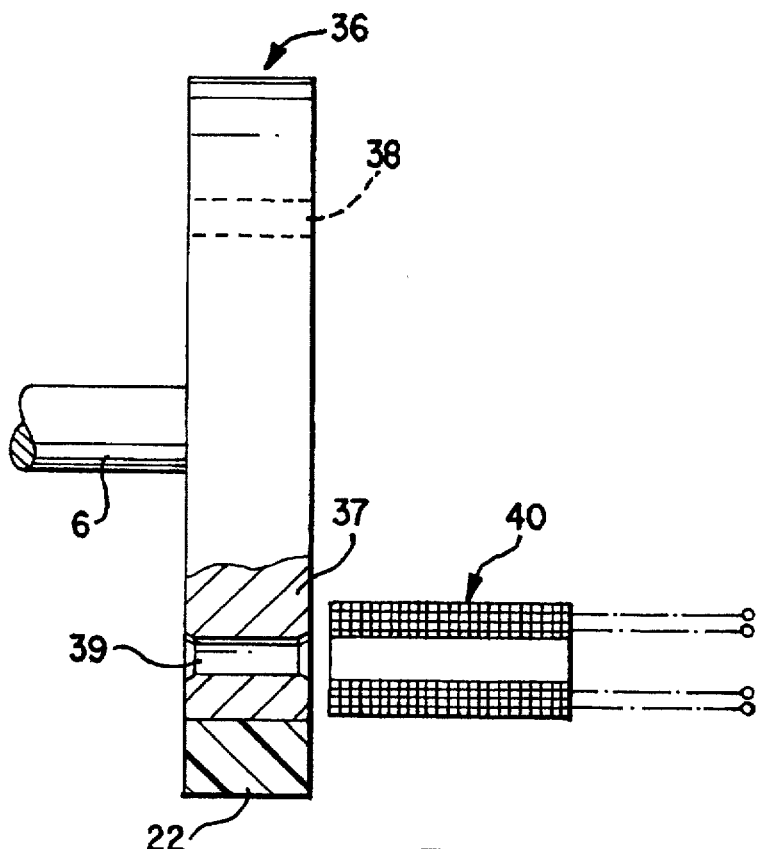
FIG. 4 is a supporting disk similar to FIG. 3, with a bore hole formed as a signal generator.

As shown in FIG. 4, a supporting disk 36 is used whose base body 37 consists of steel, which only has bore holes functioning as signal generators 38 and 39. When the supporting disk 36 is rotating, these bore holes can also disturb the magnetic field of an impulse receiver 40 and thereby generate signals which can be read by a plotting station.

Figure 5:
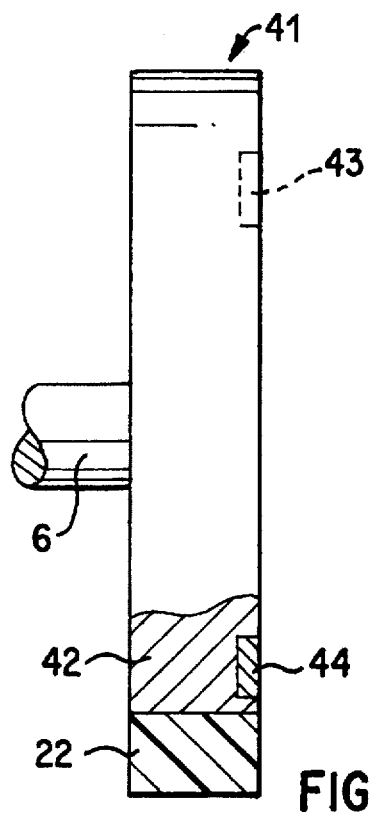
FIG. 5 is a supporting disk similar to FIG. 2, with button-like permanent magnets in bottom holes arranged on the front side.

It is not absolutely necessary to fit the signal generators flush in through bore holes of a supporting disk. As according to FIG. 5, a supporting disk 41 is intended whose base body 42 consists of for example diecast, and which contains two diametrically opposed blind holes for tablet-like signal generators 43 and 44, which are permanent magnets and are fitted flush into the blind holes. With this design magnetic fields can also be generated, whereby the surface of the front side is flat, without elevations or grooves. Also, the disk 41 could have a single magnet 44 and a balancing structure 43 disposed in the base disk 42 at a location diametrically opposite the single magnet 44, so that the unbalanced rotational assembly is rotationally balance by the balancing structure.

Figure 6:
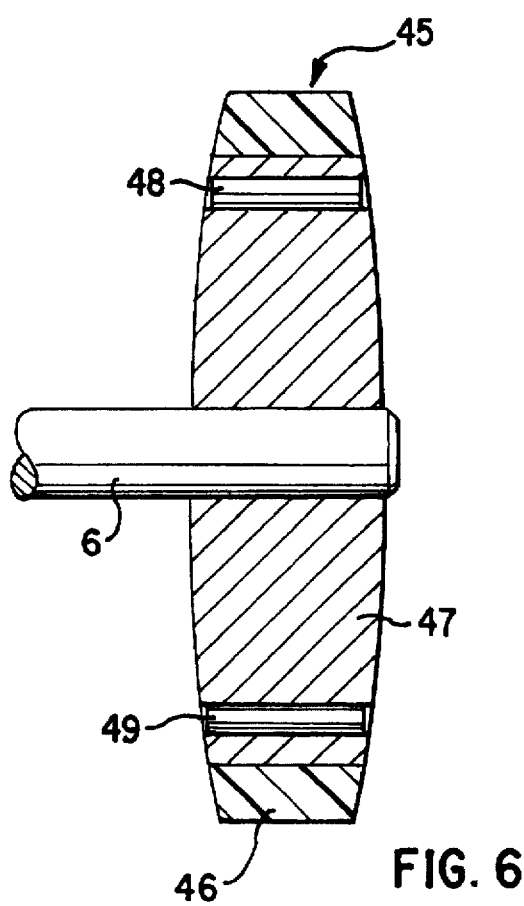
FIG. 6 is a supporting disk similar to FIG. 3, which—in longitudinal section—has a thickening in the area of the axle.

As shown in FIG. 6 a supporting disk 45 is intended, which—in longitudinal section—is slightly convex, that is, it is widest in the area of the shaft 6. With this design, permanent magnet pins or steel pins are again fitted into suitable bore holes, which function as signal generators 48 and 49.

Figure 7:
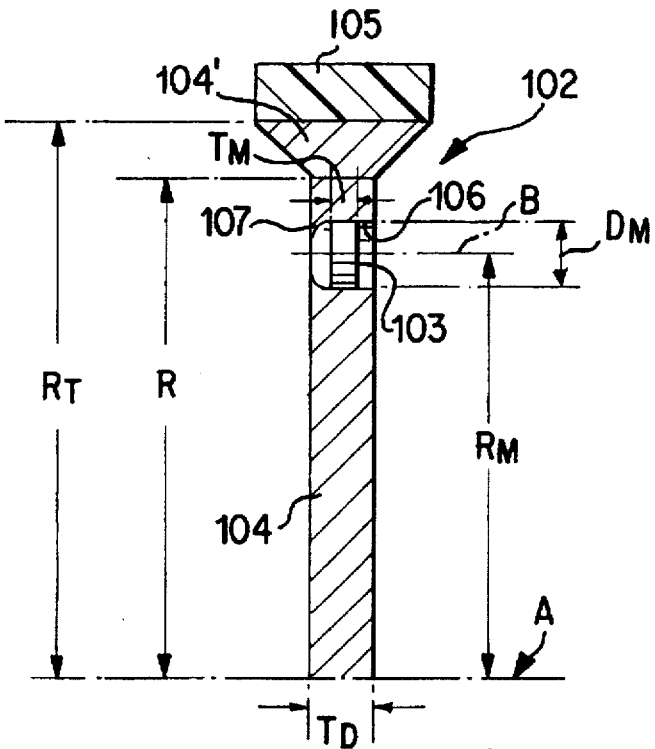
FIG. 7 is a sectional view through one-half of a supporting disk constructed according to another preferred embodiment of the invention and containing only a single signal generator in the form of a permanent magnet disposed in a hole in the disk.
Figure 8:
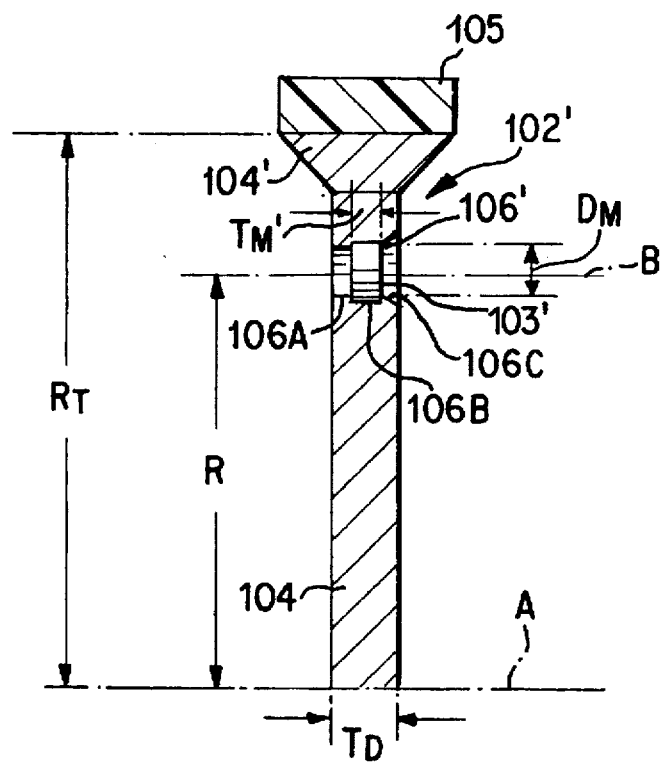
FIG. 8 is a sectional view through one-half of a supporting disk constructed according to another preferred embodiment of the invention and containing only a single signal generator in the form of a permanent magnet disposed in a hole in the disk

The embodiments of FIGS. 7 and 8 differ from the embodiments of FIGS. 1–6 in that only a single magnet is provided in the disk body. These embodiments are advantageous in that manufacturing costs are substantially reduced by requiring only a single magnet for each disk. To accommodate the mechanical balancing of the disk in spite of the single magnet construction, the present invention contemplates various mechanical balancing solutions. According to certain preferred embodiments, not illustrated, a weight or a plurality of weights is provided diametrically opposite the magnet to counter balance same.

FIG. 7 is a sectional view of one-half of a supporting disk 102 which has a rotational center line A, the bottom half not being shown since it is rotationally symmetric with respect to center line A, except there is only a single signal generating magnet 103. The supporting disk 102 is formed of a base disk body 104 made of aluminum or aluminum alloy, and is annularly surrounded by a synthetic resin shaft supporting ring 105. This ring 105 corresponds to the ring 22 described above for FIGS. 1–4, and the supporting disk 102 is used in the same manner as the supporting disks 2, 3, 4, 5 described above with respect to FIGS. 1–4.

The single magnet 103 is formed as a cylindrical disk having a diameter $D_M$ and an axial length or thickness parallel to center line A of $T_M$. The center line B for the magnet disk 103 is disposed a distance $R_M$ from the center line A of the supporting disk 102. The base disk body 104 has a substantially constant thickness $T_D$ over its radial length R, which is then expanded in section 104' to the radial length $R_T$ to where it forms the base for the synthetic ring 105.

Since in the FIG. 7 embodiment only a single magnet 103 is provided, in contrast to the double magnet embodiments described above, and further since the density of the magnet 103 is substantially higher than the density of the base disk body 104, mechanical rotational balancing to accommodate for the insertion of the magnet 193 is provided. In FIG. 7, the magnet disk 103 is disposed in a recess 106 which has a diameter corresponding to diameter $D_m$ from its right-hand end as shown in FIG. 7 up to a section 107 which forms a support for the disk 103. In the FIG. 7 embodiment, the support 107 is formed by first making the opening 106 with a slightly smaller diameter than $D_M$ (at least adjacent the right of section 107 and then inserting a swaging tool from the right end of opening 106 toward the left end to form a caulking or upset plastically deformed collar section 107. In this manner, a very economical to construct and reliable support is provided for the magnet 103. Furthermore, the dimensions of the opening 106 and the relative thickness of the disk base body $T_D$ and the thickness $T_M$ of the magnetic disk 103 are selected so that the amount of material from the base body 104 which is removed corresponds substantially equally to the mass of the magnet disk 103. In this way, a very simple mechanical rotational balancing of the supporting disk and magnet assembly is achieved.

In a preferred exemplary embodiment, the disk shaped magnet 103 has a diameter $D_M$ of 4 mm (millimeters) and a thickness $T_M$ of 1.2 mm. The thickness $T_D$ of the base disk body 104 is 3 mm. The bore hole 106 has a diameter of 4.2 mm, it being desired that the magnet disk not be forcibly pressed into the bore hole 106, but rather be inserted and glued into place by means of an anaerobic glue. With the material of the bearing disk base body 104 having a density of 2.7 g/cm³ (grams/cubic centimeters), and with the magnet 103 having a density of 7.4 g/cm³, substantially complete mass balancing is achieved.

In preferred embodiments of the FIG. 7 arrangement, the opening 106, 107 that is not filled by the magnet 103 can be filled with a filling material of resin or other material and smoothed at the ends to be flush with the axial end surfaces of the base disk body 104 so as minimize air disturbances and/or fiber catching during use on an open end spinning machine. Depending upon the mass density of the filling material provided in preferred embodiments having this opening 106 completely filled, the volume of the opening 106, 107 and the disk 103 is selected accordingly to provide for the rotational mass balancing.

FIG. 8 is a view similar to FIG. 7, showing an alternative embodiment which includes similar reference characters for similar features as described above for the FIG. 7 embodiment. The disk magnet 103' in FIG. 8 is of the same configuration as described above for the disk 103 of FIG. 7. The FIG. 8 embodiment differs from FIG. 7 in the manner in which the disk 103' is assembled in the base disk body 104. In FIG. 8, a step shaped bore hole 106' is formed in a single manufacturing step by means of a step drill. The bore hole 106' is a through bore hole which includes a first smallest step 106A, joined by a second intermediate step 106B, which is joined by the largest diameter step 106C.

Again, in order to obtain a mechanical rotational balancing of the assembly of the disk body and magnet, the stepped bore hole 106' is configured so that the mass removed corresponds to the mass added by the magnet 103' (and any filling material that may be added to form flush surfaces).

In a preferred exemplary embodiment corresponding to FIG. 8, the smaller step 106A has a diameter of 3.8 mm and a depth or axial thickness parallel to disk central axis A of 1 mm. The middle step 106B forming the mounting for the magnet has a diameter of 4.2 mm and a thickness of 1.4 mm. The third step 106C is formed as a counter bore with an angle of 45° and has a depth of 0.6 mm, namely the remainder of the total thickness of the bearing disk $T_D$ of 3 mm. In this embodiment, the disk shaped magnet is also glued in.

Also preferred embodiments corresponding to the FIG. 8 arrangement are contemplated which include filler material in the sections of the stepped bore not filled by the magnet 103' and the glue for holding the same in place.

With this method and assembly described above with respect to FIG. 8, a very economical-to-manufacture and reliable construction for the supporting disk and signal magnet assembly is achieved.

It should be noticed that it is desirable to provide the individual supporting disks 2, 3 with as smooth a surface as possible, having no elevations or notches. In relation to energy consumption, it is practical when the front sides are flat or in section—slightly convex.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A supporting disk for a supporting disk bearing for open-end spinning rotors, comprising:
   a base disk body having a rotational central axis, said base disk body being made of a first material having a first density, and
   a single magnet made of a second material having a second density different than said first density and supported in the base disk body asymmetrically with respect to the rotation axis, said single magnet serving as a signal generator indicative of rotative movement of the base disk body during use in an open end spinning machine,
   wherein only said single magnet serves as a signal generator such that said base disk body and single magnet form an unbalanced rotational assembly,
   and wherein said unbalanced rotational assembly is rotationally balanced by a balancing structure.

2. A supporting disk according to claim 1, wherein said balancing structure comprises a balancing weight disposed in said base disk body at a location diametrically opposite said single magnet.

3. A supporting disk according to claim 1, wherein said balancing structure is formed by removal of said first material in a vicinity of the magnet to provide a rotational balance of the base disk body and magnet assembly.

4. A supporting disk according to claim 3, wherein said balancing structure includes portions of a bore through the base disk body which extends parallel to and spaced radially from said rotational axis, said recess accommodating said magnet and having a volume which is greater than the volume of the magnet to provide a rotational balance of the base disk body and magnet assembly.

5. A supporting disk according to claim 4, wherein said magnet is a cylindrical disk shaped member which is shorter in an axial direction than the base disk body surrounding the bore.

6. A supporting disk according to claim 5, wherein said bore is a stepped bore including an annular support step supporting said magnet.

7. A supporting disk according to claim 6, wherein said magnet is glued to said base disk body in said bore.

8. A supporting disk according to claim 6, wherein said stepped bore is dimensioned such that the amount of first material removed to form the bore has a weight substantially equal to the weight of the second material of the magnet.

9. A supporting disk according to claim 5, wherein said bore includes a plastically deformed step section adjacent a larger diameter bore section, said step section supporting the magnet at one axial end thereof.

10. A supporting disk according to claim 9, wherein said magnet is glued to said base disk body in said bore.

11. A supporting disk according to claim 4, wherein a center of said bore is spaced from said rotational axis by more than one-half of the radius of the base disk body.

12. A supporting disk according to claim 11, wherein said magnet is a cylindrical member with a radius of less than one-fifth the radius of the base disk body.

13. A supporting disk according to claim 12, wherein said bore is spaced at least 40 mm from the rotational axis, wherein the bore is a cylindrical bore with a diameter of between 3.5 mm and 4.5 mm,
   wherein the axial thickness of the base disk body adjacent the bore is between 2 mm and 4 mm, and
   wherein the magnet is a cylindrical member having an axial length which is less than half the axial thickness of the base disk body adjacent the bore.

14. A supporting disk according to claim 4, wherein said bore is a stepped bore formed by a step drill in a single drilling operation.

15. A supporting disk according to claim 1, wherein said balancing structure includes portions of a stepped recess in the base disk body which accommodates the magnet, said stepped recess having a volume which is greater than the volume of the magnet to provide a rotational balance of the base disk body and magnet assembly.

16. A supporting disk according to claim 1, wherein the second material includes rare earth metals.

17. A supporting disk according to claim 16, wherein said second material is NdFeB (Neodym-Iron-Boron).

18. A supporting disk according to claim 1, wherein said first material is a light metal alloy.

19. A supporting disk according to claim 1, comprising a synthetic ring of a third material surrounding the base disk body.

20. A supporting disk according to claim 19, wherein said single magnet is disposed in a through hole in said base disk body.

21. A supporting disk according to claim 1, wherein said first material is aluminum.

22. A supporting disk according to claim 1, wherein said first material is synthetic material.

23. A supporting disk according to claim 1, wherein the base disk body has a slightly convex shape with a maximum axial length adjacent a connection of the base disk body to a support shaft therefor.

24. A supporting disk according to claim 1, wherein said second density is higher than said first density.

25. A supporting disk according to claim 1, wherein said balancing structure is formed by removal of portions of said first material.

26. A supporting disk according to claim 1, wherein said balancing structure is formed by removal of parts of said first material immediately adjacent the magnet.

* * * * *